(12) United States Patent  
Jang

(10) Patent No.: US 7,778,200 B2
(45) Date of Patent: Aug. 17, 2010

(54) REMOTE MANAGEMENT APPARATUS AND METHOD OF SETTING IP ADDRESS THEREOF

(75) Inventor: Chuel-jin Jang, Gwacheon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 306 days.

(21) Appl. No.: 11/685,974

(22) Filed: Mar. 14, 2007

(65) Prior Publication Data

US 2008/0043738 A1 Feb. 21, 2008

(30) Foreign Application Priority Data

Aug. 21, 2006 (KR) .............. 10-2006-0078611

(51) Int. Cl.
H04L 12/28 (2006.01)
H04L 12/56 (2006.01)
H04J 3/24 (2006.01)
G06F 15/16 (2006.01)

(52) U.S. Cl. .............. 370/254; 370/401; 370/475; 709/219; 709/245

(58) Field of Classification Search .............. None
See application file for complete search history.

(56) References Cited

U.S. PATENT DOCUMENTS

| | | | | |
|---|---|---|---|---|
| 6,009,103 | A * | 12/1999 | Woundy | 370/401 |
| 6,219,715 | B1 * | 4/2001 | Ohno et al. | 709/245 |
| 6,240,080 | B1 * | 5/2001 | Okanoue et al. | 370/338 |
| 6,505,248 | B1 * | 1/2003 | Casper et al. | 709/224 |
| 6,578,088 | B2 * | 6/2003 | Ohno et al. | 709/245 |
| 6,625,645 | B1 * | 9/2003 | Van Horne et al. | 709/221 |
| 6,728,884 | B1 * | 4/2004 | Lim | 726/12 |
| 6,789,103 | B1 * | 9/2004 | Kim et al. | 709/203 |
| 6,834,050 | B1 * | 12/2004 | Madour et al. | 370/392 |
| 6,842,769 | B1 * | 1/2005 | Kim et al. | 709/203 |

(Continued)

FOREIGN PATENT DOCUMENTS

CN 1527540 A 9/2004

(Continued)

OTHER PUBLICATIONS

Korean Office Action dated Oct. 31, 2007 issued in KR 2006-0078611.

(Continued)

*Primary Examiner*—Gregory B Sefcheck
(74) *Attorney, Agent, or Firm*—Sughrue Mion, PLLC

(57) ABSTRACT

A remote management apparatus and a method of setting an IP address thereof. The remote management apparatus includes a determination unit to determine whether an IP address of a server connected through a network coincides with an IP address intended to be used for communications with the server, and a control unit to perform an IP address mapping for the server and automatically allocating the mapped IP address to the server if the IP address of the server and the IP address intended to be used for the communications with the server do not coincide with each other. When an IP-based device is added to a network in which the remote management apparatus takes part, the IP address of the added device is automatically set for the convenience of the user.

17 Claims, 1 Drawing Sheet

U.S. PATENT DOCUMENTS

| | | |
|---|---|---|
| 7,127,524 B1 * | 10/2006 | Renda et al. ................. 709/245 |
| 7,609,701 B2 * | 10/2009 | Yang et al. ............. 370/395.52 |
| 7,616,635 B2 * | 11/2009 | Slaight ....................... 370/390 |
| 2002/0065806 A1 * | 5/2002 | Kim ............................. 707/1 |
| 2004/0174904 A1 | 9/2004 | Kim et al. |
| 2004/0267876 A1 * | 12/2004 | Kakivaya et al. ............ 709/200 |
| 2005/0015458 A1 | 1/2005 | La |
| 2005/0086375 A1 * | 4/2005 | Bielski ....................... 709/245 |
| 2006/0089998 A1 * | 4/2006 | Kim et al. ................... 709/229 |
| 2006/0120317 A1 * | 6/2006 | Zheng ........................ 370/315 |
| 2006/0242287 A1 * | 10/2006 | Cetin et al. ................. 709/223 |
| 2007/0022211 A1 * | 1/2007 | Shimizu et al. ............. 709/238 |
| 2007/0195800 A1 * | 8/2007 | Yang et al. .................. 370/401 |

FOREIGN PATENT DOCUMENTS

| | | |
|---|---|---|
| KR | 2002-0073846 | 9/2002 |
| KR | 2006-0037554 | 5/2006 |

OTHER PUBLICATIONS

European Search Report dated Dec. 19, 2007 issued in EP 07109563.2.

Ralph Droms—Bucknell University; Automated Configuration of TCP/IP with DHCP; XP-000874503, 1999.

* cited by examiner

REMOTE MANAGEMENT APPARATUS AND METHOD OF SETTING IP ADDRESS THEREOF

CROSS-REFERENCE TO RELATED APPLICATIONS

This application claims priority under 35 U.S.C. §119(a) of Korean Patent Application No. 2006-78611, filed Aug. 21, 2006, in the Korean Intellectual Property Office, the entire disclosure of which is hereby incorporated herein by reference.

BACKGROUND OF THE INVENTION

1. Field of the Invention

The present general inventive concept relates to a remote management apparatus and a method of setting an IP (Internet Protocol) address thereof. More particularly, the present general inventive concept relates to a remote management apparatus and a method of setting an IP address thereof that can automatically provide an IP address to a server when the server is detected.

2. Description of the Related Art

Recently, home network systems, in which a plurality of control devices are connected to networks installed in houses or buildings and the control devices are mutually controllable, have been increasingly utilized. Home network systems extend control regions of controllers by remotely controlling a plurality of control devices through terminals accessible to the Internet in places outside houses or buildings.

A home network is a system in which various home devices are provided with respective separate communication functions, and can communicate with one another as well as connect to the Internet. A home network is capable of controlling major home devices such as refrigerators, air conditioners, microwave ovens, TV receivers, digital cameras, digital camcorders, and so forth, through the wire/wireless Internet.

A monitoring system monitors images received from a home network system and a plurality of monitoring cameras, remotely controls home devices or surveillance cameras, and a display device that is mainly used as such a remote management device. In order to control the home devices, the display device should allocate respective IP addresses to the home devices.

However, in the conventional remote management device, an IP address should be allocated to each home device, and in the case of adding any home device to the system, the user should set the IP address of the added home device. This causes inconvenience to the user, and it is difficult for a user who uses the network for the first time to set the IP address of the home device.

SUMMARY OF THE INVENTION

The present general inventive concept provides a remote management apparatus and a method of setting an IP address thereof, which can automatically provide an IP address to a device constituting a network to control the device.

Additional objects and aspects of the present general inventive concept will be set forth in part in the description which follows and, in part, will be obvious from the description, or may be learned by practice of the general inventive concept.

The foregoing and/or other aspects and utilities of the present general inventive concept may be achieved by providing a determination unit to determine whether an IP address of a server connected through a network coincides with an IP address intended to be used for communications with the server, and a control unit to perform an IP address mapping for the server and automatically allocate the mapped IP address to the server if the IP address of the server and the IP address intended to be used for communications with the server do not coincide with each other.

The control unit may perform the mapping of last figures of IP addresses except the already used IP addresses among pre-allocated IP addresses in either an ascending order or a descending order.

The control unit may allocate the mapped IP addresses to servers corresponding to received hello packets in the order of hello packet reception.

The remote management apparatus according to embodiments of the present general inventive concept may further include a transmission/reception unit to receive the hello packet from the server, transmitting data that includes IP address information allocated by the control unit to the server, and receiving an IP ACK that is a response to the transmitted data from the server. If the determination unit determines that the IP ACK has not been received, the control unit may control the transmission/reception unit to retransmit the data that includes the allocated IP address information to the server.

The hello packet may include at least one of a server name, an IP address of a server, and state information of a server, and the determination unit may determine whether the IP address of the server has already been set to the IP address intended to be used for the communications with the server on the basis of state information of the server. If it is determined that the IP address of the server has already been set, the control unit may communicate with the server by using the set IP address of the server, without performing the IP mapping.

The state information may be "1" in the case where the IP address of the server has been set, and "0" in the case where the IP address of the server has not been set.

The foregoing and/or other aspects of the present general inventive concept may also be achieved by a method of setting an IP address, which includes determining whether an IP address of a server connected through a network coincides with an IP address intended to be used for communications with the server, and performing an IP address mapping of the server and automatically allocating the mapped IP address to the server if the IP address of the server and the IP address intended to be used for communications with the server do not coincide with each other.

The allocating may include performing the mapping of IP addresses except the already used IP addresses among pre-allocated IP addresses in either an ascending order or a descending order.

The allocating may include allocating the mapped IP addresses to servers corresponding to received hello packets in the order of hello packet reception.

The method of setting an IP address according to embodiments of the present general inventive concept may further include receiving the hello packet from the server, transmitting data that includes IP address information allocated by the control unit to the server, and receiving an IP ACK that is a response to the transmitted data from the server. In this case, if the determination unit determines that the IP ACK has not been received, the allocating step may include re-transmitting the data that includes the allocated IP address information to the server through the receiving step.

The hello packet may include at least one of a server name, an IP address of a server, and state information of a server, and the determining step may include determining whether the IP address of the server has already been set to the IP address intended to be used for the communications with the server on the basis of state information of the server. In this case, if it is determined that the IP address of the server has already been set, the allocating step may include communicating with the server by using the set IP address of the server, without performing the IP mapping.

The state information may be "1" in the case where the IP address of the server has been set, and "0" in the case where the IP address of the server has not been set.

The foregoing and/or other aspects of the present general inventive concept may also be achieved by a method of a network host to assign IP addresses to respective servers, including: providing a network; providing a plurality of addressable or re-addressable servers, each server being connected to the network; waiting for an hello packet to arrive at the host over the network from one of the servers; determining if the hello packet includes an original IP address of the one server, and (a) if the hello packet does not include an original IP address, then addressing the one server by allocating and transmitting an intended IP address to the one server, or (b) if the hello packet includes an original IP address, then determining if any IP address has already been allocated to the one server by the network host and, if no IP address has already been so allocated, then re-addressing the one server by allocating and transmitting an intended IP address to the one server to replace the original IP address at the server; and waiting for a new hello packet from another one of the servers.

The method may further include generating the intended IP address by arithmetically incrementing or decrementing a numerical field of an IP address previously allocated by the host or the corresponding numerical field of a starting IP address predetermined by the host.

The foregoing and/or other aspects and utilities of the present general inventive concept may be achieved by providing a network host for connection to servers via a network, including: a comparator to determine if an original IP address included in an hello packet received from a server is the same as any intended IP address of the server that is stored in a memory; and a controller to allocate a new intended IP address to the server if the original IP address is not the same as any intended IP address of the memory.

The new intended IP address may be arithmetically equal to an increment or a decrement of an IP address previously allocated by the host and not equal to any IP address stored in the memory.

The network new intended IP address optionally is not stored in the memory.

BRIEF DESCRIPTION OF THE DRAWINGS

These and/or other objects and aspects of the present general inventive concept will become apparent and more readily appreciated from the following description of the embodiments, taken in conjunction with the accompanying drawings of which.

Throughout the drawings, like reference numbers should be understood to refer to like elements, features, and structures.

DETAILED DESCRIPTION OF THE PREFERRED EMBODIMENTS

Figure 1:
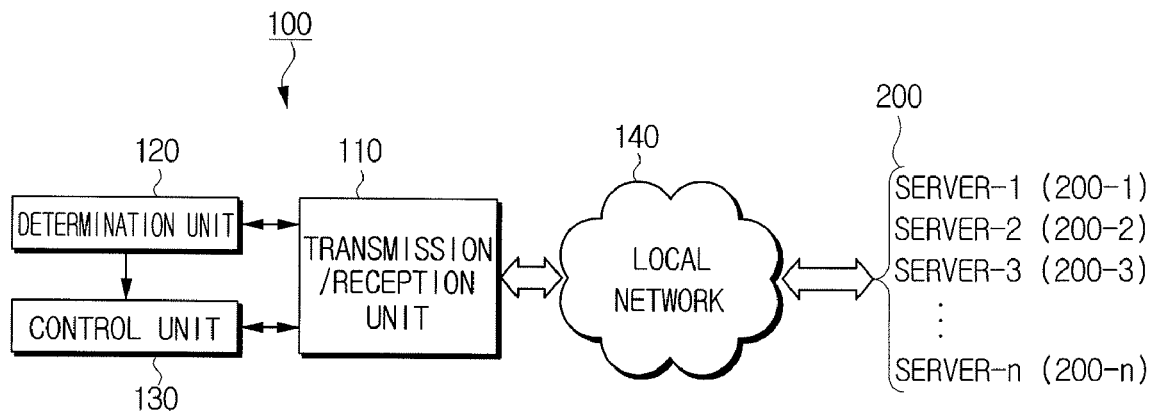
FIG. 1 is a block diagram illustrating the construction of a remote management apparatus to which the present general inventive concept can be applied.

Reference will now be made in detail to the embodiments of the present general inventive concept, examples of which are illustrated in the accompanying drawings, wherein like reference numerals refer to the like elements throughout. The embodiments are described below in order to illustrate the present general inventive concept by referring to the figures.

FIG. 1 is a block diagram illustrating the construction of a remote management apparatus to which the present general inventive concept can be applied. The remote management apparatus includes a transmission/reception unit 110, a determination unit 120, and a control unit 130. The remote management apparatus can be a display device such, as a wall pad, which can control and monitor devices having IPs (Internet Protocols), but the remote management apparatus is not limited thereto.

The transmission/reception unit 110 transmits/receives data to/from a plurality of servers 200 (illustrated as 200-1, 200-2, ... 200-n) that are connected through a local network 140.

Figure 2:
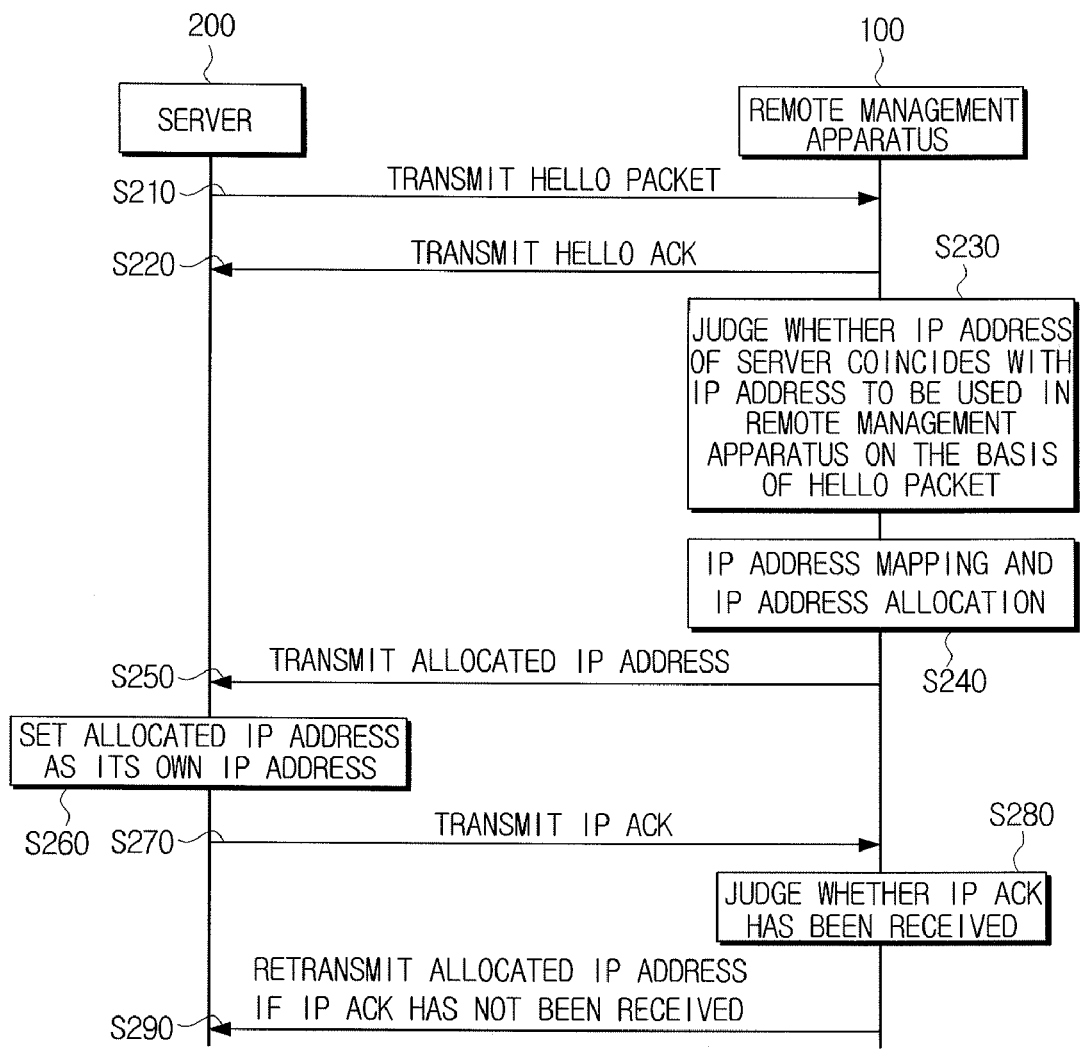
FIG. 2 is a flowchart illustrating an automatic address setting method of a remote management apparatus according to an embodiment of the present general inventive concept.

The transmission/reception unit 110 of the remote management apparatus 100 receives a hello packet from one server 200, and transmits a hello ACK to the server 200 in response to the received hello packet (the hello packet and hello ACK are illustrated in FIG. 2, to be described in more detail below). Then, the transmission/reception unit 100 transmits to the server 200 data that includes IP address information to be allocated to the server 200, and receives an IP ACK from the server 200 in response to the IP address information. The hello packet includes the name of the server 200, the IP address of the server 200, and state information of the server 200. The transmission/reception unit 100 may be part of a network host.

On the basis of the hello packet received through the transmission/reception unit 110, the determination unit 120 determines whether the original IP address of the server 200 is the IP address that the remote management apparatus 100 intends to use. The determination unit 120 makes this determination by comparing the corresponding IP addresses with each other. For example, the determination may be made by comparing the original IP address to intended addresses stored in a memory that is part of the determination unit 120. The IP address of the server 200 included in the hello packet may have a null value or may not be set to a specified value. On the other hand, the IP address may be preset as a default when the server is manufactured, or may be preset by another remote management apparatus.

In addition, the determination unit 120 determines whether the IP ACK transmitted from the server 200 has been received.

If the determination unit 120 determines that the IP address of the server 200 which is included in the hello packet is different from the IP address that the remote management apparatus 100 intends to use, the control unit 130 performs an IP address mapping, while if the determination unit 120 determines that the IP address of the server 200 coincides with the IP address that the remote management apparatus 100 intends to use, the control unit 130 controls the server 200 by using the IP address already allocated to the server 200.

The control unit 130 performs the mapping of the IP addresses of the servers 200 by arranging last figures of the IP addresses, except for the IP addresses which have already been used by the remote management apparatus 100, among the pre-allocated IP addresses in either an ascending order or a descending order. In this case, the control unit 130 allocates the mapped IP addresses to the servers in the order of hello packet reception from the servers 200. Here, the same gateway address as the remote management unit 100 is allocated to the servers 200. The control unit 130 controls the transmission/reception unit 110 to transmit data that includes allocated IP address information to the servers which have transmitted the hello packets.

In addition, if it is determined that the IP ACK has not been received through the transmission/reception unit 110, the control unit 130 controls the transmission/reception unit 110 to re-transmit the data that includes the allocated IP address information to the server 200.

FIG. 2 is a flowchart illustrating an automatic address setting method of a remote management apparatus according to an embodiment of the present general inventive concept.

Referring to FIG. 2, the transmission/reception unit 110 first receives a hello packet transmitted from the server 200 at operation S210. Here, the hello packet may include the name of the server 200, the original IP address of the server 200, state information of the server 200, and so forth. The original IP address of the server 200 included in the hello packet may have a null value (for example, the numerical value of zero) or may not be set to a specified value (for example, the hello packet may contain no field corresponding to an IP address). Also, the IP address may be preset as a default when the server 200 is manufactured, or may have been preset by another remote management apparatus.

Then, the transmission/reception unit 110 transmits a response packet (i.e., a hello ACK) to the server 200 in response to the hello packet received from the server 200 at operation S220.

At operation S230 the determination unit 120 determines whether the IP address of the server 200, as specified in the hello packet, coincides with the IP address that the remote management apparatus 100 intends to use. If the determination unit 120 determines that the IP address of the server 200 contained in the hello packet coincides with the IP address that the remote management apparatus 100 intends to use for the server 200, the control unit 130 controls the server 200 by using the IP address already allocated to the server 200.

However, if at operation S230 the determination unit 120 determines that the IP address of the server 200 that was included in the hello packet is different from the IP address that the remote management apparatus 100 intends to use, the control unit 130 performs an IP address mapping and allocates the mapped IP address to the server 200 that transmitted the hello packet at operation S240.

The mapping of the IP addresses for the servers is performed by arranging last figures of the IP addresses in either an ascending order or a descending order. IP addresses which have already been used by the remote management apparatus 100 among the pre-allocated IP addresses are not part of the mapping operation. The control unit 130 allocates the mapped IP addresses to the servers 200 in the order of hello packet reception from the servers, and allocates the same gateway address as the remote management unit 100 to the servers 200. For example, if the last digits of the IP addresses are ... 1, ... 2, ... 3, ... and server 200-7 (which might be, for example, a television) is the first server to send a hello packet, then the address ending in 1 could be assigned to the server 200-7. Another example is presented below.

On the assumption that the IP address of the remote management apparatus 100 is set to "192.168.0.100" and the gateway address is set to "192.168.0.1", the control unit 130 arranges the IP addresses, except for the IP addresses having been used by the remote management apparatus 100 (in this example, addresses including 192.168.0.100), among the pre-allocated IP addresses in either an ascending order or a descending order. That is, the control unit 130 performs the mapping of the IP addresses for the servers by arranging the IP addresses in an ascending order or in a descending order, from "192.168.0.2" to "192.168.0.255", except for "192.168.0.100" that is the IP address of the remote management apparatus 100.

Then, the control unit 130 allocates the mapped IP addresses to the servers 200 in the order of hello packet reception. For example, in the case of mapping the IP addresses in an ascending order and receiving the hello packets in the order of server-1 to server-4, the control unit 130 allocates by turns the IP addresses "192.168.0.2" to "192.168.0.5" to server-1 200-1 through server-4 200-4.

Thereafter, the control unit 130 operates the transmission/reception unit 110 to transmit data including the allocated IP address information to the server 200 that has transmitted the hello packet at operation S250. Then, the server 200 sets the IP address allocated from the remote management apparatus 100 as the IP address of the server 200 at operation S260.

Then, at operation S270, the transmission/reception unit 110 receives an IP ACK that is the response to the data including the allocated IP address information from the server 200.

The determination unit 120 determines whether the IP ACK transmitted from the server 200 has been received at operation S280.

If the IP ACK has not been received, the control unit 130 operates the transmission/reception unit 110 to retransmit the data including the allocated IP address information to the server 200 at operation S290. That is, if it is determined that the IP ACK has not been received through the transmission/reception unit 110, the control unit 130 re-transmits the data including the allocated IP address information, which was transmitted at operation S250 to the server 200 which transmitted the hello packet. In this case, it is preferable that the control unit 130 re-transmits the data including the IP address information only to the server 200 that has not transmitted the IP ACK.

The servers 200 connected to the remote management apparatus 100 may include home devices such as digital cameras, digital camcorders, TV receivers, air conditioners, PCs, and so forth.

In the remote management apparatus and the IP address setting method of the present inventive concept, IP addresses may automatically be allocated to servers 200 connected to one remote management apparatus 100, as described above. However, it is also possible to automatically allocate IP addresses to servers connected to plural remote management apparatuses.

When allocating IP addresses to plural servers connected to two remote management apparatuses to control the servers, the first remote management apparatus allocates the IP addresses to the servers in the same manner as that described at operations S210 to S290.

In this case, the second remote management apparatus determines that the IP address has already been allocated to the server, on the basis of state information included in the hello packet received from the server, sets connection for communications with the server by using the IP address of the server included in the hello packet, and then transmits/receives data to/from the server. Here, the state information included in the hello packet is information that reports whether the IP address of the server set through operations S210 to S290 is an existing IP address.

That is, the determination unit 120 determines whether the IP address of the server has been set on the basis of the state information included in the hello packet, and if it is determined that the IP address of the server has been set, the control unit 130 communicates with the server by using the already set IP address of the server without performing the IP mapping. Here, the state information is, for example, "1" in the case where the IP address of the server has been set, and "0" in the case where the IP address of the server has not been set.

As described above, in the case where an IP-based device is added to a network in which a remote management apparatus takes part, the IP address of the added device is automatically set, and this gives convenience of use.

Also, in the case of controlling servers through a plurality of remote management apparatuses connected to the same local network, the IP addresses of the servers are automatically set only once, and then the plurality of remote management apparatuses set connections for communications with the servers by using the already set IP addresses, so that a procedure of additionally allocating the IP address to the server through the respective remote management apparatuses can be omitted.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A remote management apparatus of a network to which a plurality of servers are connected, the apparatus comprising:
   a determination unit which determines whether an original Internet protocol (IP) address of a new server, which is not included in the plurality of servers, coincides with an IP address intended to be used for communications with the new server, when the new server is connected to the network; and
   a control unit which performs an IP address mapping for the new server and automatically allocates the intended IP address to the new server according to the IP address mapping if the determination unit determines that the original IP address of the new server and the intended IP address do not coincide with each other;
   wherein the intended IP address is one of pre-allocated IP addresses which are not currently being used by any of the plurality of servers and the remote management apparatus when the new server is connected to the network.

2. The remote management apparatus of claim 1, wherein the control unit performs the IP address mapping based on last figures of the pre-allocated IP addresses in either an ascending order or a descending order.

3. The remote management apparatus of claim 1, wherein the pre-allocated addresses are IP addresses intended to be used for communications with a plurality of new servers, including the new server, any one of which is not included in the plurality of servers connected to the network, and
   wherein, if the plurality of new servers are connected to the network, the control unit allocates the intended IP addresses to the plurality of new servers in the order of reception of hello packets transmitted from the plurality of new servers, respectively, the hello packets comprising respective original IP addresses of the plurality of new servers.

4. The remote management apparatus of claim 1, further comprising a transmission/reception unit which receives a hello packet from the new server, the hello packet comprising information on the original IP address of the new server, transmits information on the intended IP address allocated by the control unit to the new server, and receives from the new server an IP acknowledgment (ACK) signal that acknowledges receipt of the transmitted information on the intended IP address at the new server;
   wherein if the determination unit determines that the IPACK signal has not been received at the transmission/reception unit, the control unit controls the transmission/reception unit to re-transmit the data that includes information on the intended IP address allocated by the control unit to the new server.

5. The remote management apparatus of claim 4, wherein:
   the hello packet further comprises at least one of an identifier of the new server and state information on the new server;
   the determination unit determines whether the original IP address of the new server is set to the intended IP address on the basis of the state information on the new server; and
   if the determination unit determines from the state information that the original IP address of the new server has already been set to the intended IP address, the control unit communicates with the new server by using the original IP address of the new server, without performing the IP address mapping.

6. The remote management apparatus of claim 5, wherein the state information has a flag "1" if the determination unit determines that the original IP address of the new server has already been set to the intended IP address, and the state information has a flag "0" if the determination unit determines that the original IP address of the new server has not been set to the intended IP address.

7. A method of setting an Internet protocol (IP) address in a network to which a plurality of servers are connected, the method comprising:
   determining, by a remote manager, whether an original IP address of a new server, which is not included in the plurality of servers, coincides with an IP address intended to be used for communications with the new server, when the new server is connected to the network; and
   performing, by the remote manager, an IP address mapping for the new server and automatically allocating the intended IP address to the new server according to the IP address mapping if the original IP address of the new server and the intended IP address do not coincide with each other;
   wherein the intended IP address is one of pre-allocated IP addresses which are not currently being used by any of the plurality of servers and the remote management apparatus when the new server is connected to the network.

8. The method of claim 7, wherein the automatically allocating the intended IP address is performed based on last figures of the pre-allocated IP addresses in either an ascending order or a descending order.

9. The method of claim 7, wherein the pre-allocated addresses are IP addresses intended to be used for communications with a plurality of new servers, including the new server, any one of which is not included in the plurality of servers connected to the network, and
   wherein the automatically allocating the intended IP address is performed when the intended IP addresses are allocated to the plurality of new servers in the order of reception of hello packets respectively transmitted from the plurality of new servers, respectively, the hello packets comprising respective original IP addresses of the plurality of new servers.

10. The method of claim 7, further comprising:
receiving a hello packet from the new server, the hello packet comprising information on the original IP address of the new server, transmitting information on the intended IP address allocated by the control unit to the new server, and receiving from the new server an IP acknowledgment (ACK) signal that acknowledges receipt of the transmitted information on the intended IP address at the new server;
wherein if it is determined that the IP ACK signal has not been received, the information on the intended IP address is re-transmitted to the new server.

11. The method of claim 10, wherein the hello packet further comprises at least one of an identifier of the new server, and state information on the new server;
wherein the determining comprises determining whether the original IP address of the new server is set to the intended IP address on the basis of the state information on the new server; and
wherein if it is determined from the state information that the original IP address of the new server has already been set to the intended IP address, communicating with the server by using the original IP address of the server, without performing the IP address mapping.

12. The method of claim 11, wherein the state information has a flag "1" if it is determined that the original IP address of the new server has already been set to the intended IP address, and the state information has a flag "0" if it is determined that the original IP address of the new server has not been allocated set to the intended IP address.

13. A method of a network host to assign Internet protocol (IP) addresses to respective servers, comprising:
providing a network to which a plurality of servers are connected;
providing a plurality of new servers, each server being newly connected to the network;
waiting to receive a hello packet at the network host over the network from a new server among the plurality of new servers;
determining if the hello packet includes an original IP address of the new server;
if the hello packet does not include the original IP address, then addressing the new server by allocating and transmitting an intended IP address to the new server, wherein the intended IP address is one of pre-allocated IP addresses which are not currently being used by any of the plurality of servers and the network host when the plurality of new servers are connected to the network; and
if the hello packet includes the original IP address, determining if any IP address has already been allocated to the new server by the network host, and, if no IP address has already been so allocated, then allocating one of the pre-allocated IP addresses to the new server to replace the original IP address at the new server; and
waiting for a new hello packet from another new server among the plurality of new servers.

14. The method according to claim 13, comprising:
generating the intended IP address by arithmetically incrementing or decrementing a numerical field of an IP address which is currently being used by the network host or a corresponding numerical field of a starting IP address predetermined by the network host.

15. A network host for a network to which a plurality of servers are connected, the network host comprising:
a comparator to determine if an original Internet protocol (IP) address included in a hello packet received from a new server, which is not included in the plurality of servers, is the same as any intended IP address that is stored in a memory, when the new server is connected to the network; and
a controller to map pre-allocated IP addresses which are not currently being used by any of the plurality of servers and the network host, and to allocate a new intended IP address from among the pre-allocated IP addresses to the new server if the original IP address is not the same as any intended IP address stored in the memory.

16. The network host of claim 15, wherein the new intended IP address is arithmetically equal to an increment or a decrement of an IP address previously allocated by the network host and is not equal to any IP address stored in the memory.

17. The network host of claim 15, wherein the new intended IP address is not stored in the memory.

* * * * *